UNITED STATES PATENT OFFICE.

JAMES CANE COOMBE, OF HOXTON, COUNTY OF MIDDLESEX, ENGLAND.

IMPROVEMENT IN INDURATING AND PRESERVING STONE, CEMENTS, WOOD, &c.

Specification forming part of Letters Patent No. 38,287, dated April 28, 1863.

*To all whom it may concern:*

Be it known that I, JAMES CANE COOMBE, of Haberdasher Street, Hoxton, in the county of Middlesex, England, chemist, have invented an invention for an improved process for indurating and preserving stone, statuary, bricks, tiles, and other analogous materials, and also in the manufacture of artificial stone, mortar, cement, and such like substances; and I do hereby declare that the following specification is a description of my invention sufficient to enable those skilled in the art to practice it.

In operating upon stone, statuary, bricks, tiles, and such like substances, either when they are in use in buildings or before they are applied to building purposes, and for the purpose of indurating and preserving the same, I make use of hydrofluosilicic acid, and I propose to apply it as follows: If the stone or other material to be acted upon possesses in its constitution potash, alkaline earths, or bases capable of forming insoluble compounds with the hydrofluosilicic acid, I use the hydrofluosilicic acid, and I apply it to the stone or material to be operated upon either by washing its surface with the acid or by immersing it in the solution, or by any other known process. Should the stone or material to be acted upon not contain potash, lime, or alkali, or alkaline earths capable of forming insoluble compounds with the hydrofluosilicic acid, then I impregnate the same with a solution of potash or its salts, or with lime, baryta, magnesia, or other alkaline earths, which with the acid will form insoluble compounds. These solutions may be introduced into the material either by immersion, by pressure, or by exhaustion, or any other known method. Having introduced within the materials to be acted upon the potash, alkali, or alkaline solution, I then, as before described, make use of hydrofluosilicic acid. In some cases where the potash or its salts or other alkalies are applied it may be necessary, before using the hydrofluosilicic acid, to subject the stone to the atmosphere or artificial temperature in order to dry and solidify them. The result of my process is that the hydrofluosilicic acid enters into combination with the potash or its salts, or with the base or bases either naturally existing in the stone or artificially introduced, and forms with it or with them an insoluble compound or compounds.

In the manufacture of artificial stones, mortar, cement, and such like substances, I make use of the precipitated silica obtained by the manufacture of hydrofluosilicic acid or any other means, and mix it in various proportions with lime-mortar, cement, and other combinations and such like materials containing alkalies, for which silica has a strong affinity, and which either with or without the aid of artificial heat it enters into combination. In some cases I use the silica in its gelatinous state, and combine hydrofluosilicic acid in the substance or use it as a coating.

I would here remark that I am acquainted with the processes employed by Kuhlman, as described in his patent of August 12, 1856, and his processes referred to in Murpratt's Chemistry, volume 2, page 246, as also those described in the English patents of Way and Payne, November 17, 1852, and December 11, 1852, numbered respectively 771 and 1,034, and I do not claim anything therein contained.

What I claim is—

1. The process herein described for indurating and preserving stone, bricks, slates, wood, and other analogous materials by the use of a solution of fluosilicic acid, in the manner substantially as set forth.

2. The process herein described for the manufacture of artificial stones, mortar, cement, and such like substances by the employment of hydrofluosilicic acid, precipitated silica, lime, and alkalies, in the manner set forth.

JAMES CANE COOMBE.

Witnesses:
SAMUEL ARCHBUTT,
R. WM. WELCH.